United States Patent [19]
Green

[11] Patent Number: 5,996,654
[45] Date of Patent: Dec. 7, 1999

[54] QUICK-CONNECT FILLING DEVICE FOR TRANSFERRING FLUIDS TO A VALVE

[76] Inventor: Edward E. Green, 166/2 Eilot Street, Eilat 88140, Israel

[21] Appl. No.: 09/133,177

[22] Filed: Aug. 12, 1998

[30] Foreign Application Priority Data

Aug. 21, 1997 [IL] Israel .......................................... 121602

[51] Int. Cl.[6] ...................................................... B65B 1/04
[52] U.S. Cl. .......................... 141/383; 141/384; 141/388; 285/34; 285/35
[58] Field of Search ................................... 141/383–389; 285/34, 35, 307, 315, 318

[56] References Cited

U.S. PATENT DOCUMENTS

| 3,757,836 | 9/1973 | Masuda | 285/35 |
| 5,649,723 | 7/1997 | Larson | 285/34 |
| 5,788,443 | 8/1998 | Cabahug | 285/35 |

Primary Examiner—Steven O. Douglas
Assistant Examiner—Khoa Huynh
Attorney, Agent, or Firm—Ladas & Parry

[57] ABSTRACT

A quick-connect filling device for transferring fluids to a valve having a female thread in its inlet port, the device comprising a stem having a through-going conduit for fluid flow therethrough and an enlarged upper plug end for sealing abutment with a tank valve, a plurality of externally-threaded screw segments, forming a single screw thread when aligned, and extending axially and positioned concentrically around the stem beneath the enlarged plug end, a sleeve-like element concentrically surrounding the stem and reciprocally slidable between a first locking position in which an upper portion of the sleeve-like element extends between the stem and the screw segments and outwardly urges the segments into threaded engagement with complementary female threads of the tank valve, and a second withdrawn open position in which the upper portion of the sleeve-like element extends only between the stem and a bottom portion of the screw segments, allowing the release of the segments from the engagement, a resilient element surrounding the screw segments in an area above the bottom portion, for urging the upper portions of the segments into contact with the stem and disengagement from the valve threads, and locking device for locking the sleeve-like element in the first locking position.

9 Claims, 2 Drawing Sheets

QUICK-CONNECT FILLING DEVICE FOR TRANSFERRING FLUIDS TO A VALVE

The present invention relates to a quick connector to a valve having a female thread in its inlet port.

More particularly, the invention provides such a connector that is suitable for the high pressures used when storing gasses in steel, aluminum, plastic and fiber composite cylinders, and provides a locking device to prevent inadvertent release.

Compressed gas cylinders are used for many industrial, agricultural and medical purposes. Cylinders used for supplying breathing air contain air or oxygen-enriched air. Such cylinders are used by divers, firefighters, and rescue personnel and by workers having to carry out their duties in a dangerously contaminated atmosphere. The stored gas is held in a cylinder at high pressure, which can be 5000 psi or even higher. High pressure is needed so that a satisfactory quantity of air is available for use from a cylinder of moderate bulk. The gas is supplied for use at near atmospheric pressure after two-stage pressure reduction.

Gas cylinders are fitted with an on-off valve to allow recharge after the contents have been depleted. This valve fulfills the additional function of allowing the cylinder contents to be checked quantitatively by pressure measurement, or for checking gas quality. For example, in the case of cylinders containing air for breathing, gas contents are sometimes checked to determine that the air is dry, clean, and that the standard level of carbon monoxide is not exceeded. As a 500 ppm level of CO for an extended period can be fatal, safe practice is to check air quality in cylinders used by divers.

Conventional pressure cylinders using valves to which attachments are to be made use yoke type devices such as are typically found on a SCUBA regulator or on an oxygen regulator. Attachment is carried out by tightening a nut mounted on the back of the yoke. Normally the yoke is placed over the top on the cylinder valve, the orifice on the front of the valve is aligned with the orifice of the attached device, and is then locked in place by tightening the hand nut on the yoke a number of turns until the device is held tightly in place, and the two ports are interconnected but sealed from the atmosphere. The cylinder valve is then opened so as to supply the breathing device. When many cylinders are to be handled, such as in the commercial refilling of depleted gas cylinders, the task becomes tedious and time consuming.

Some types of gas cylinder have a female thread in the valve inlet port. Consequently any connecting device for this type of cylinder must be provided with a male screw thread connector, which normally requires many turns to screw on or off. In order to save the time needed therefor, collapsible male screw connectors have been proposed for these and other purposes. These are described in the following patents.

In U.S. Pat. No. 589,813 Campbell describes and claims a hose coupling of the type used for water in fire fighting activities. It comprises two telescopic sections and swinging arms having a spiral thread for engagement of an interior thread of the larger of the sections. The device is simple but no locking device is provided. On connection the thread teeth are pushed over the thread grooves, and the resulting wear means that the coupling is suited only for occasional use. No seal elements are provided, and high leakage rates would be certain to result if the device were used to contain high pressure gas.

Kaiser discloses a breakaway coupling in U.S. Pat. No. 2,705,652 that includes the use of segment finger portions that can be presented in socket formation over an externally screwed stud part. The couple is joined by screwing, and has no fast connection method. Disassembly is effected by subjecting the joint parts to a linear pulling force, a mode of disassembly that would be very dangerous if high pressure gas were contained in the conduit.

U.S. Pat. No. 2,820,481 discloses a lever action pipe plug intended for conduits carrying liquids. The device includes a plurality of segmental elongated grips grouped around an intermediate tapered sleeve. The device is not suited for intensive use for the same reason as the Cambell device, that during adjustment the screw threads drag across the mating threads and would wear out prematurely.

In U.S. Pat. No. 5,575,510 Weh et al. disclose a quick-connect fitting that is specifically intended for use in filling high pressure gas cylinders, and indeed appears to suit this purpose. However the inventor's claim regarding the use of a minimum of simple parts is challenged by the present invention. It is also to be noted that the Weh fitting requires disassembly when the pressure spring 28 operating the clamping tongs needs to be replaced.

Quick-action couplers are widely used in industrial compressed air systems, and are commercially available for hoses up to 10 inch in diameter. A half coupling is attached to the two hose ends requiring connection. Either half contains a leak-proof shut-off valve, usually a simple poppet valve, that closes automatically on separation, and opens on connection. The halves are fitted with an external locking device for interconnection. These couplers are low cost but suffer from the disadvantage of high pressure loss. Industrial compressed air systems typically operate at around 100 psi, and are thus easily interconnected. However, in contradistinction to the present invention, no locking device is provided on quick action couplers of this type, which are intended for connection and disconnection while one half is under pressure; due to the high connection force which must be applied if connection of the halves is to be made when one of the hoses is under high pressure, an integral bleeder valve would be required to relieve local pressure before connection can be effected.

It is therefore one of the objects of the present invention to obviate the disadvantages of prior art quick-connect filler devices and to provide a device that can be repeatedly used at high gas pressure without leakage.

It is a further object of the present invention to provide a device that can be both connected and disconnected easily, quickly and securely.

The present invention achieves the above objects by providing a quick-connect filling device for transferring fluids to a valve having a female thread in its inlet port, said device comprising:

a) a stem having a through-going conduit for fluid flow therethrough and an enlarged upper plug end for sealing abutment with a tank valve;

b) a plurality of externally threaded screw segments, forming a single screw thread when aligned, and extending axially and positioned concentrically around said stem beneath said enlarged plug end;

c) a sleeve-like element concentrically surrounding said stem and reciprocally slidable between a first locking position in which an upper portion of said sleeve-like element extends between said stem and said screw segments and outwardly urges said segments into threaded engagement with complementary female threads of said tank valve, and a second withdrawn open position in which said upper portion of said sleeve-like element extends only between said stem and a bottom portion of said screw segments, allowing the release of said segments from said engagement;

d) a resilient element surrounding said screw segments in an area above said bottom portion, for urging said upper portions of said segments into contact with said stem and disengagement from said valve threads; and e) locking means for locking said sleeve-like element in said first locking position.

In a preferred embodiment of the present invention there is provided a quick-connect filling device wherein the screw segments are revolvably driven by a toothed flange engaging spaces between these segments, the toothed flange being rigidly attached in a recessed disk revolvably mounted around the sleeve-like element, the recessed disk having a shoulder to retain thereunder a flange of the screw segments.

In a most preferred embodiment of the present invention there is provided quick-connect filling device wherein a headed pin rides in a keyhole slot in a recessed disk, a partial revolution in one direction of a serrated-edge disk effecting engagement of the screw segments with the female threads of the tank valve. Also effected is engagement of the first locking position wherein the head of said pin prevents inadvertent downward movement of the sleeve-like element thus preventing accidental disconnection while the device is under pressure.

A partial revolution in the reverse direction effects unlocking of the locking means, loosening of screwed engagement to the tank valve, and allows subsequent axial withdrawal of the sleeve-like element to complete disengagement.

Further embodiments of the invention will be described hereinafter.

In German Patent no. DE 39 29 566 A1 Teve describes and claims a connection for fluid pipes and containers for a hydraulic test appliance. A plurality of threaded, radially movable segments are splayed apart by the axial movement of a conical surface of a bolt which presses them against a seal. The bolt is manually pressed inwards against the force of a compression spring. The device is intended for use on high pressures, and has simple and relatively few parts. However a major problem can be foreseen in the prevention of leakage. Four seal elements are required for this purpose, nos. 24, 31, 32 and an additional seal not shown for inlet 25. Particularly problematic is seal 32. The seal 32 is of a diameter considerably larger than the connector screw fitting, and it is a dynamic seal, as the guide bushing 18 moves inside the housing. Such sealing is particularly difficult where high pressure gasses are to be contained. In contradistinction thereto, the present invention requires only a static small diameter inlet seal and a static seal at the stem head. The seal at the stem head is also of a smaller diameter than that of the connector fitting, conditions which ensure satisfactory sealing of high-pressure gas.

It will thus be realized that the novel device of the present invention serves to:

a) allow quick connection and disconnection using a unit made of a small number of easily manufactured parts;

b) provide effective sealing when handling liquids or gases at high or low pressure; and c) provide a safety device to prevent inadvertent disconnection while the device is under pressure.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
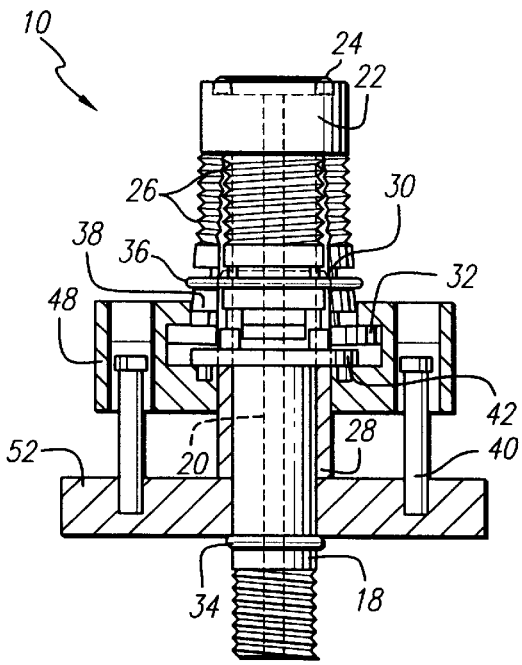
FIG. 1 is an elevational view of a preferred embodiment of the filling device in its open configuration, according to the invention.
Figure 2:
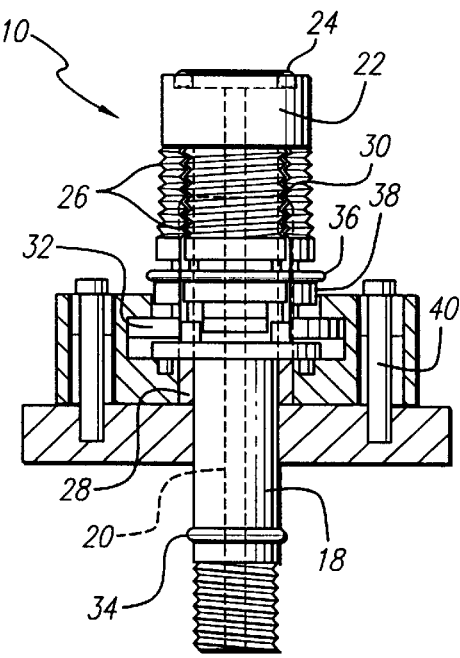
FIG. 2 is an elevational view of the same in its closed configuration
Figure 6:
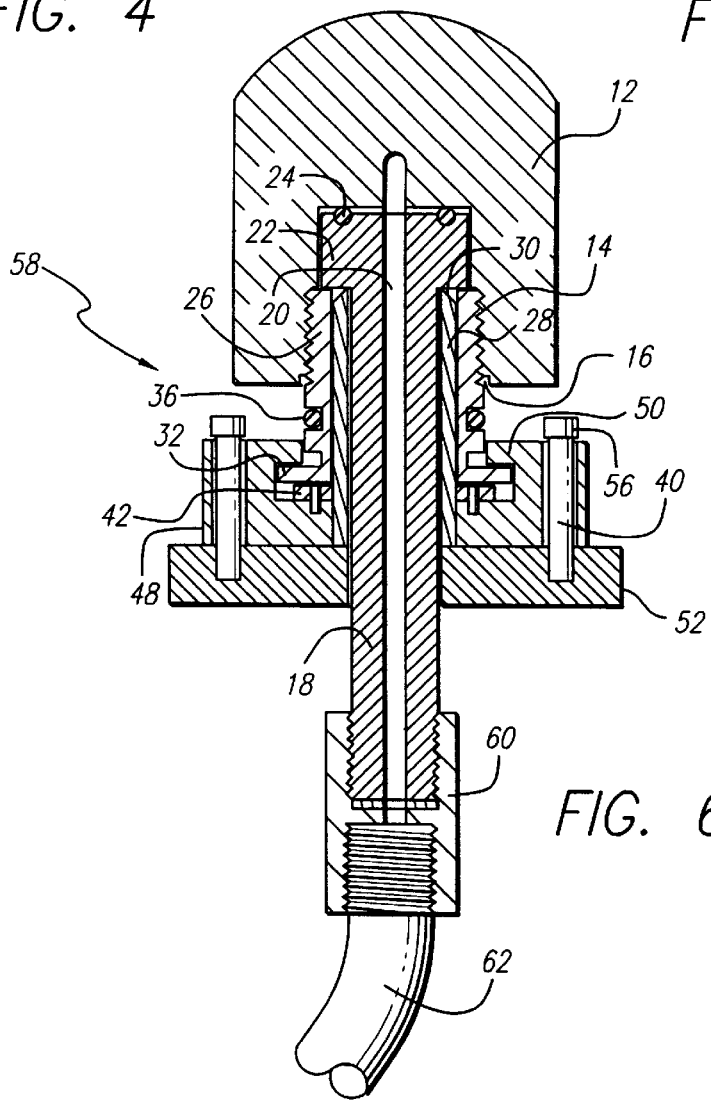
FIG. 6 is a sectional elevational view of an embodiment, locked to a tank valve, and provided with a connector for a filler hose.

There is seen in FIGS. 1 & 2 a quick-connect filling device 10 for transferring fluids, including gases at high pressures, to a tank valve 12, which is seen in FIG. 6, having a female thread 14 in its inlet port 16.

The device 10 has a central stem 18 having a through-going conduit 20 for fluid flow therethrough. An enlarged upper plug end 22 has a flexible seal element 24 for sealing abutment with the valve 12 seen in FIG. 6.

Four externally threaded screw segments 26 form a single male screw thread when aligned and extended outwards as seen in FIG. 2. The segments 26 extend axially and are positioned concentrically around stem 18 beneath enlarged plug end 22.

A sleeve-like element 28 concentrically surrounds stem 18 and is reciprocally slidable therealong. In FIG. 2 the sleeve-like element 28 is seen in a first locking position, shown in the figure as its highest position. An upper portion 30 of sleeve-like element 28 extends between stem 18 and screw segments 26 and outwardly urges segments 26 into threaded engagement with complementary female thread 14 of valve 12, seen in FIG. 6.

In a second, withdrawn, open position as seen in FIG. 1 the upper portion 30 extends only between stem 18 and a bottom portion 32 of screw segments 26, allowing the release of segments 26 from engagement. A split metal ring 34 prevents excess downward axial movement of the sleeve-like element 28.

A resilient element 36 surrounds screw segments 26 in an area 38 above bottom portion 32, for urging upper portions of segments 26 into contact with stem 18 and disengagement from thread 14.

The resilient element 36 can suitably comprise a metal spring clip. In a further embodiment, the resilient element 36 is a tension spring hooked end to end to form a ring. It is also possible to use a rubber ring, as replacement thereof when needed can be effected without dismantling any part of the device 10.

Two headed pins 40 provide locking means for locking sleeve-like element 28 in its first locking position as seen in FIG. 2. This locking device, which prevents the inadvertent opening of the device before and after pressure is applied will be described with reference to FIGS. 4 & 5.

With reference to the rest of the figures, similar reference numerals have been used to identify similar parts.

Figure 3:
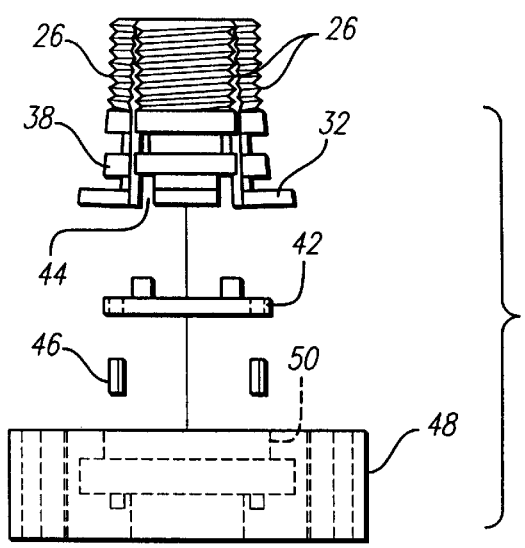
FIG. 3 is an exploded view of the screw segments and the components driving same.

FIG. 3 illustrates a detail of screw segments 26 to show how they are rotationally driven. A toothed flange 42 engages spaces 44 between segments 26. Flange 42 is rigidly attached, by means of pins 46 in recessed disk 48. In the shown embodiment flange 42 and recessed disk 48 are shown made for manufacturing convenience by machining as separate parts. These two components can however be made as an integral unit by metal powder metallurgy.

The recessed disk 48 is driven by the headed pins 40 as will be described with reference to the following figures.

The recessed disk 48 has a shoulder 50 to retain thereunder bottom portion 32 and toothed flange 42.

In the current device the outside diameter of 42 is 0.02 mm smaller than the inside diameter of the hole in 50, to allow it to be inserted during assembly. However, in embodiments in which the entire piece is cast this will not be necessary.

Figures 4, 5:
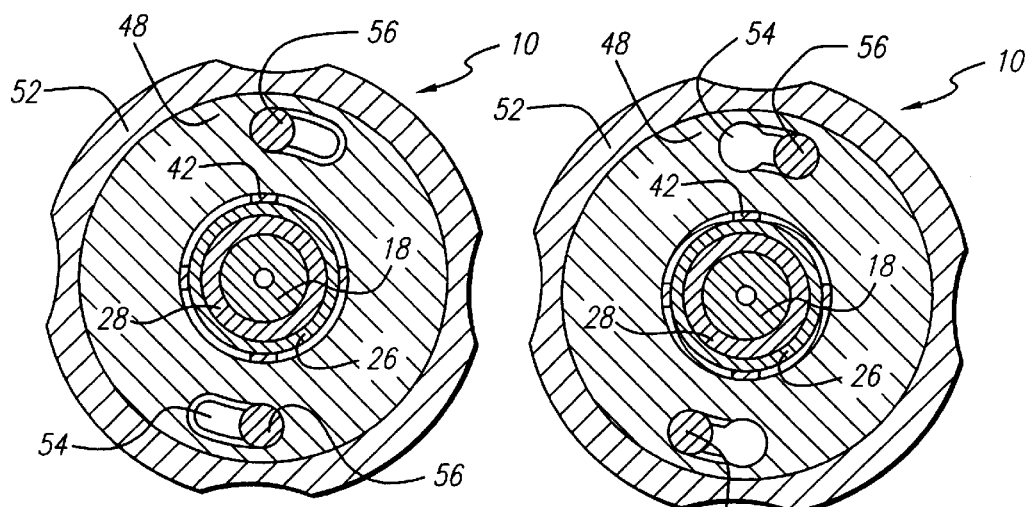
FIG. 4 is a plan view of the device showing the locking device and the serrated edge disk, in the open position.
FIG. 5 is the same in the locked position.

Seen in FIG. 4 is the filling device 10 showing the locking device and the serrated edge disk 52, in the open position; FIG. 5 shows the same in the locked position.

The sleeve-like element 28 is provided with a rigidly attached serrated-edge disk 52 for convenient gripping by one hand. When so gripped, the element 28 can be moved both axially and be revolved.

The locking means comprises two headed pins 40 seen in FIG. 1, operationally connecting sleeve-like element 28 to recessed disk 48. Each headed pin 40 rides in a keyhole slot 54 in recessed disk 48, a partial revolution in one direction of serrated-edge disk 52 effecting engagement of screw segments 26 with female thread 14 seen in FIG. 6. Also effected is engagement of first locking position as seen in FIG. 5, wherein the head 56 of pin 40 prevents inadvertent downward movement of sleeve-like element 28 thus preventing accidental disconnection while the device 10 is under pressure.

A partial revolution of serrated edge disk 52 in the reverse direction effects unlocking of locking means, as seen in FIG. 4. Consequent loosening of screwed engagement to valve 12 allows subsequent axial withdrawal of sleeve-like element 28 to complete disengagement of screw segments 26.

FIG. 6 shows a similar embodiment of a filling device 58, in the locked position, and connected to part of a tank valve 12 that has a female thread 14 in its inlet port 16.

The filling device 58 is further provided with a screwed connector fitting 60 for connection to a filler hose 62. Fitting 60 serves the additional function of providing stop means when the sleeve-like element 28 is reciprocally slid down into the second withdrawn open position as seen in FIG. 1.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A quick-connect filling device for transferring fluids to a valve having a female thread in its inlet port, said device comprising:

a) a stem having a through-going conduit for fluid flow therethrough and an enlarged upper plug end for sealing abutment with a tank valve;

b) a plurality of externally-threaded screw segments, forming a single screw thread when aligned, and extending axially and positioned concentrically around said stem beneath said enlarged plug end;

c) a sleeve-like element concentrically surrounding said stem and reciprocally slidable between a first locking position in which an upper portion of said sleeve-like element extends between said stem and said screw segments and outwardly urges said segments into threaded engagement with complementary female threads of said tank valve, and a second withdrawn open position in which said upper portion of said sleeve-like element extends only between said stem and a bottom portion of said screw segments, allowing the release of said segments from said engagement;

d) a resilient element surrounding said screw segments in an area above said bottom portion, for urging said upper portions of said segments into contact with said stem and disengagement from said valve threads; and e) locking means for locking said sleeve-like element in said first locking position.

2. A quick-connect filling device according to claim 1, wherein said screw segments are revolvably driven by a toothed flange engaging spaces between said segments, said toothed flange being rigidly attached in a recessed disk revolvably mounted around said sleeve-like element, said recessed disk having a shoulder to retain thereunder a flange of said screw segments.

3. A quick-connect filling device according to claim 1, wherein said sleeve-like element is provided with a rigidly-attached serrated-edge disk for convenient gripping by one hand.

4. A quick-connect filling device according to claim 2, wherein said locking means comprises at least one headed pin operationally connecting said sleeve-like element to said recessed disk.

5. A quick-connect filling device according to claim 4, wherein said headed pin rides in a keyhole slot in said recessed disk, a partial revolution in one direction of said serrated-edge disk effecting engagement of said screw segments with said female threads of said tank valve as well as engagement of said first locking position wherein the head of said pin prevents inadvertent downward movement of said sleeve-like element thus preventing accidental disconnection while the device is under pressure; whereas a partial revolution in the reverse direction effects unlocking of said locking means, loosening of screwed engagement to said tank valve, and allows subsequent axial withdrawal of said sleeve-like element to complete disengagement.

6. A quick-connect filling device according to claim 1, wherein said resilient element is a metal spring clip.

7. A quick-connect filling device according to claim 1, wherein said resilient element is a tension spring.

8. A quick-connect filling device according to claim 1, wherein said resilient element is a rubber ring.

9. A quick-connect filling device according to claim 1, further provided with a screwed connector fitting for connection to a filler hose, said fitting providing stop means when said sleeve-like element is reciprocally slid down into said second withdrawn open position.

* * * * *